United States Patent [19]

Cox

[11] 4,350,348

[45] Sep. 21, 1982

[54] SEALING OF TELESCOPICALLY RELATED ELEMENTS

[75] Inventor: Nigel B. Cox, Southowram, England

[73] Assignee: Halifax Tool Company Limited, Yorkshire, England

[21] Appl. No.: 92,269

[22] Filed: Nov. 8, 1979

[30] Foreign Application Priority Data

Nov. 10, 1978 [GB] United Kingdom ............... 44129/78

[51] Int. Cl.³ .............................................. F16J 15/16
[52] U.S. Cl. ..................................... 277/199; 277/31; 277/154; 277/157; 175/414
[58] Field of Search ............... 175/320, 327, 359, 371, 175/414; 277/12, 31, 192, 197, 154, 157, 193–196, 198, 199, 177

[56] References Cited

U.S. PATENT DOCUMENTS

| 601,614 | 3/1898 | Dudley | 277/106 |
|---|---|---|---|
| 648,474 | 5/1900 | Ward | 277/199 |
| 1,498,104 | 6/1924 | McCorkle | 277/199 X |
| 1,560,763 | 11/1925 | Collins | 277/31 |
| 3,023,014 | 2/1962 | Donner | 277/157 X |
| 3,297,091 | 1/1967 | Dale | 277/31 X |
| 3,322,216 | 5/1967 | Kurt | 175/414 X |
| 3,365,202 | 1/1968 | Carleton | 175/359 X |
| 3,936,247 | 2/1976 | Tschirky et al. | 175/320 X |

FOREIGN PATENT DOCUMENTS 911422 10/1972 Canada ............................... 175/320

Primary Examiner—Robert S. Ward, Jr.
Attorney, Agent, or Firm—Shlesinger, Fitzsimmons & Shlesinger

[57] ABSTRACT

Sealing means for telescopically related elements, especially elements such as the bit shank and body of a fluid-powered free piston hammer drill, comprise a diametrically divided sealing ring dimensioned to run sealingly and circumferentially uninterruptedly on a cylindrical sealing surface on one of the elements (e.g. the bit shank of a hammer drill) and sealingly to engage the other of the elements (e.g. the drill body). The sealing ring may be constructed of any material suited to its duty. If it is to perform a retaining function by limiting relative motion of the elements it may be of steel or other hard and strong material and may if required have a flexible or elastomeric sealing element.

9 Claims, 5 Drawing Figures

SEALING OF TELESCOPICALLY RELATED ELEMENTS

BACKGROUND OF THE INVENTION

The invention concerns the sealing of telescopically related components to provide for relative reciprocating motion therebetween while effecting a seal to minimise fluid leakage between the relatively moving surfaces of the elements. The invention is applicable in a number of fields but is especially applicable in the field of fluid- (e.g. pneumatic-) powered tools such as hammer drills, especially important applications being in the field of so-called down-the-hole hammer drills used for rock drilling and the invention will be described in relation to applications in that field.

A typical down-the-hole hammer drill used for rock drilling purposes consists of a drill body within which a piston is caused to reciprocate to deliver blows upon an anvil surface at the end of the shank of a bit that protrudes from the drill body and is provided with a cutting face having such a configuration as to form a bore hole suitably larger than the drill body so as to enable this to follow the bit into the bore hole as the latter increases in length. In order that the hammer blows delivered by the piston to the bit shank may be effectively transmitted to the cutting face of the bit, and thus to the rock or other formation with which the bit is engaged, the bit must have some freedom of axial (longitudinal) movement with respect to the drill body: thus the drill body must include parts that coact with the bit shank to hold this suitably aligned with the body while permitting the required degree of relative motion. These bit-retaining and locating arrangements must usually provide for the transmission of torque between the drill body and the bit shank in order that rotation of the drill body may be imparted to the bit.

Because the anvil surface of the bit shank is exposed to blows by the piston, that end of the bit shank communicates with the working chamber to which pressure fluid—usually compressed air—is admitted to cause movement of the piston away from the bit shank after delivering a blow upon the anvil surface. Although provision is often made for exhausting the fluid from this chamber through passages in or adjacent to the bit shank, uncontrolled leakage of fluid from the said chamber represents a loss of energy and results in inefficiency in the conversion of pressure fluid energy into drilling effect. Accordingly, provision must be made to minimise such wasteful leakage of pressure fluid along the bit shank.

THE PRIOR ART

Numerous arrangements are known or have been proposed for retaining, locating and sealing the bit shanks in the drill bodies of such down-the-hole hammer drills and like devices. Typical of the known arrangements is that in which location and guidance of the bit shank, and the transmission of torque thereto, is provided by complementary splines on the bit shank and in a guide sleeve in the drill body, the bit shank being retained in the guide sleeve by a retaining device, e.g. an offset transverse pin or a ring, that engages suitable shoulders on the bit shank and is fitted into the drill body. To provide the required seal against fluid leakage the bit shank is formed with a cylindrical surface portion that is engaged by a suitable sealing ring.

The bit shank of a down-the-hole rock drill is a highly stressed component subject to severe shock loadings in an abrasive environment. To secure a long working life, therefore, the shank should have the maximum practicable cross-section and so far as possible be free of local reductions in its section, that provide regions of increased stress in operation, such as grooves that provide shoulders for abutment with retaining devices or that provide base surfaces for cooperation with a sealing ring.

However, for a given drill body cross-section, any increase in the bit shank cross-section is at the expense of the annular cross-section available for the retaining, locating and sealing arrangements in the drill body.

The design compromise between maximum bit shank cross-section, avoidance of local section reduction, and adequate guiding, retaining and sealing arrangements in the drill body is affected by the requirement to be able to assemble and dismantle the relevant components for the purposes of changing the drill bit when required. This requirement imposes limitations upon the order in which parts may be introduced into the end of the drill body during assembly and, thus, upon the relative locations of certain of the components. Moreover, if, for instance, the sealing arrangements provide for co-operation between a sealing ring and a terminal cylindrical portion of the bit shank adjacent to its anvil surface, this arrangement restricts the anvil surface area and usually involves the use of a stemmed piston—that is to say a piston having a stemmed protuburance of cross-section matching the anvil surface and arranged to strike the latter. The satisfactory manufacture of reliable stemmed pistons is a more difficult and hence more costly process than the manufacture of equivalent unstemmed pistons.

Hammer drills and especially down-the-hole hammer drills are usually operated in conjunction with a shock-absorber unit interposed between the drill body and the pipes by which power pressure fluid, and perhaps also flushing fluid, is conveyed to the hammer unit from externally of the bore hole. Such a shock-absorber unit may be integrated with a hammer drill unit or it may be a separate unit intended for attachment to the hammer drill body, usually in the manner of a drill pipe. In either case the shock-absorber unit consists of telescopically interfitting parts having limited axial movement and although the stress levels and in particular the shock loads to which such units are exposed in operation are generally less than those applicable to the drill bit and its connections to the drill body, there is limited annular cross-section available for the components of the unit so that the provision of adequate retaining, location and sealing arrangements of the relatively movable parts of a shock-absorber unit involves design compromises not dissimilar from those discussed in connection with the drill bits.

A specific object of the invention is therefore to provide sealing arrangements that are especially advantageous in their application to down-the-hole hammer drills for the purposes discussed.

SUMMARY OF THE INVENTION

Telescopically related elements such as a drill bit shank and a hammer drill body are sealed by means of a diametrically divided sealing ring dimensioned to run sealingly and circumferentially uninterruptedly on a cylindrical sealing surface on one of the elements and sealingly to engage the other of said elements.

In preferred embodiments, the divided sealing ring runs between abutments on the said one element and is fixed in position with respect to the other element thereby to limit the relative motion between the elements and serve, for instance, to retain the one element within a range of positions relative to the other. More specifically, the sealing ring is fixed against axial movement on the one element, and abutment means are provided on the other element for engagement by the sealing ring to limit movement thereof on the sealing surface, and thereby to limit relative motion of the elements.

Because the sealing ring is divided it may be assembled in position to fit partly within a groove or recess inaccessible to a rigid undivided or complete sealing ring. Thus, for instance, the divided sealing ring may be assembled to engage and run on a sealing surface formed in a recess between fixed abutments or shoulders on the one element without compromise to the construction of the latter. In the case of sealing a drill bit shank in a drill body, the bit shank may thus be provided with a cylindrical sealing surface at any convenient region along its length and disposed between fixed shoulders or abutments. In a typical embodiment, a bit shank has the usual longitudinal splines to provide for transmission of torque from the drill body to the bit, and a sealing surface constituted by a cylindrical relieving of the splines, over a suitable part of the length thereof, down to approximately the root diameter of the inter-spline grooves. In such an embodiment, the minimum cross-section of the bit shank is determined by the depth of the splines and is not compromised by the provision of the sealing surface.

Where, as will usually be the case, the sealing ring is to be fixed in position with respect to the said other element—for instance the drill body in the embodiment considered—it may conveniently be located between a pair of abutments on said other element, at least one of these abutments being removable to provide for assembly and dismantling.

In the case of the embodiment considered, a drill body may be fitted with a removable abutment in the form of a retaining ring or chuck dimensioned to be passed over the bit shank before assembly of the said divided sealing ring over the sealing surface of the bit shank, and adapted to be fixed in the end of the drill body when the bit shank, fitted with the divided sealing ring, is introduced thereinto, whereby the end of said retaining ring or chuck constitutes an abutment engaging the divided sealing ring to hold this in position within the drill body and against another, fixed, abutment therein.

The retaining ring or chuck in such an arrangement may be shaped to be complementary to the bit shank portion over which it fits: that is, it may be splined to engage splines on the bit shank so that when the retaining ring or chuck is fixed in the drill body it constitutes part of a torque transmission path from the latter to the bit.

Depending upon the duty that the divided sealing ring has to perform, it may be formed of any suitable material. If it is required to perform a purely sealing function in relatively unstressed operating conditions, it may be formed of material chosen primarily for its sealing properties. However if, as is preferred, the sealing ring is to perform also a retaining and/or locating function it will require to be formed of materials suitable for performing that function. For instance, in the case of a divided sealing ring intended for performing also a bit-retaining function in a hammer drill, the sealing ring is preferably formed of hardened metal. If desired the sealing ring may be of composite construction and include a flexible or elastomeric sealing element.

In the preferred embodiment adapted to retain a drill bit in a drill body, the sealing ring is formed of hardened steel and is fitted externally with a complete elastomeric sealing ring that is fitted over the divided metallic portion of the ring after assembly of the latter in position in relation to the bit shank sealing surface. Because the external dimension of the divided metallic portion of the ring exceeds the overall diameter of the bit shank to which the ring is to be fitted, the passing of a flexible or elastomeric sealing ring over the bit shank for fitment over the external surface of the divided ring, after its assembly in position, causes no problems.

THE DRAWINGS

A down-the-hole hammer drill unit embodying the invention is illustrated by way of example in the accompanying drawings in which:

FIGS. 1A and 1B together constitute a part-sectional elevation of a down-the-hole hammer drill, showing bit-retaining and sealing arrangements embodying the invention;

DESCRIPTION OF PREFERRED EMBODIMENT

Figure 1A:
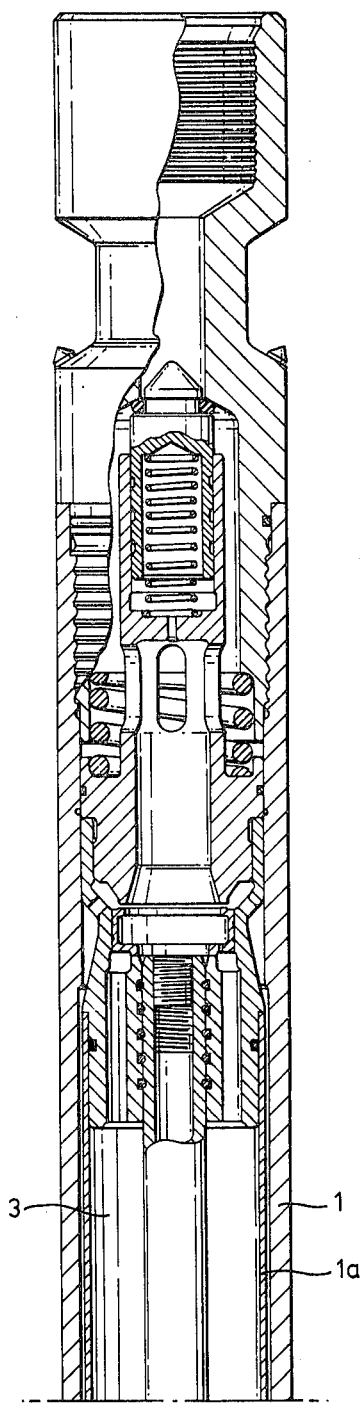
Figure 1B:
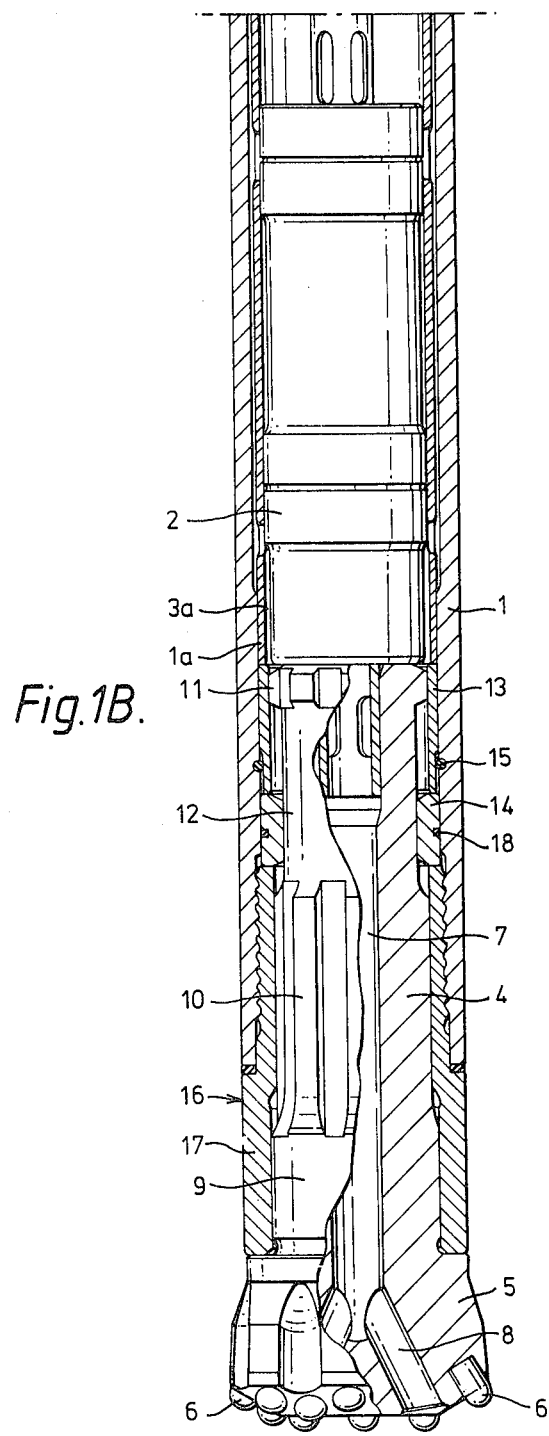

The hammer drill illustrated in FIGS. 1A and 1B comprises a drill body having an outer casing 1 fitted with a liner 1a within which a piston 2 is reciprocable under the influence of compressed air admitted alternately to working chambers 3 and 3a at opposite ends of the liner 1a. In the drawing, the piston 2 is shown in its power stroke-end position at the instant of delivering a blow to an anvil surface at the end of the shank 4 of a bit 5 having a head with a cutting face fitted with hard inserts 6. The bit shank 4 has a central passage 7 extending to exhaust passages 8 in the bit head and through which air is exhausted from the working chambers of the liner 1a as the piston 2 reciprocates.

The bit shank 4 comprises a guiding portion 9 adjacent to the bit head and having a cylindrical surface, and splined portions 10 and 11 interrupted by a sealing portion 12 having a cylindrical sealing surface substantially coextensive with the bases of the grooves between the splines of the splined portions 10 and 11. The splines of the splined portions 10 and 11 are aligned.

The bit is retained within the drill body with limited freedom for axial motion, being shown in its fully-retracted position.

The splined portion 11 of the bit shank is axially reciprocable within a guide sleeve 13 that has a plain cylindrical bore engaging the outer surfaces of the splines of the portion 11 so as to guide the latter during reciprocation of the bit, while allowing rotation of the latter relative to the drill body casing 1 during assembly, as will be described. The guide sleeve 13 is a tight—e.g. an interference—fit in the casing 1 and is positively located by abutment at one end with the liner 1a and at its other end with a divided bit-retaining and sealing ring 14 that runs on the sealing surface of the sealing portion 12 of the bit shank. A steel snap-ring 15 is located in a groove in the casing 1 and engages a reduced-diameter outer surface portion of the guide sleeve 13.

The splined portion 10 of the bit shank is engaged by complementary splines in a retaining ring or chuck 16 that has screw-threaded engagement with the end of the casing 1 as shown and the end of which provides an abutment engaging the ring 14 so that in the assembled condition the ring 14 is fixed in position by being trapped between the guide sleeve 13 and the retaining ring or chuck 16.

The chuck 16 has an end portion 17 with an internal cylindrical guide surface complementary to that of the guide portion 9 of the bit shank and of slightly larger diameter than the overall diameter of the splined portions 10 and 11 so that the chuck 16 may be passed over the bit shank into the position shown, during assembly, without risk of damage to its guiding surface through contact with the splined portions 10 and 11 as these pass through the end portion 17.

Figure 2:
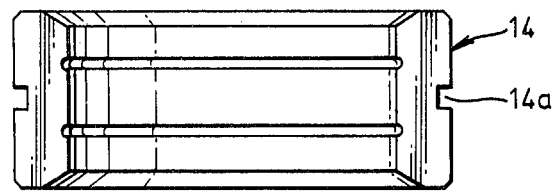
FIG. 2 is an axial section of the divided bit-retaining and sealing ring.
Figure 3:
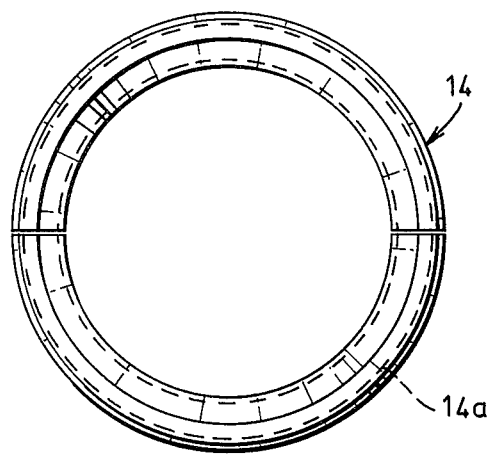
FIG. 3 is an end view of the bit-retaining and sealing ring of FIG. 2.
Figure 4:
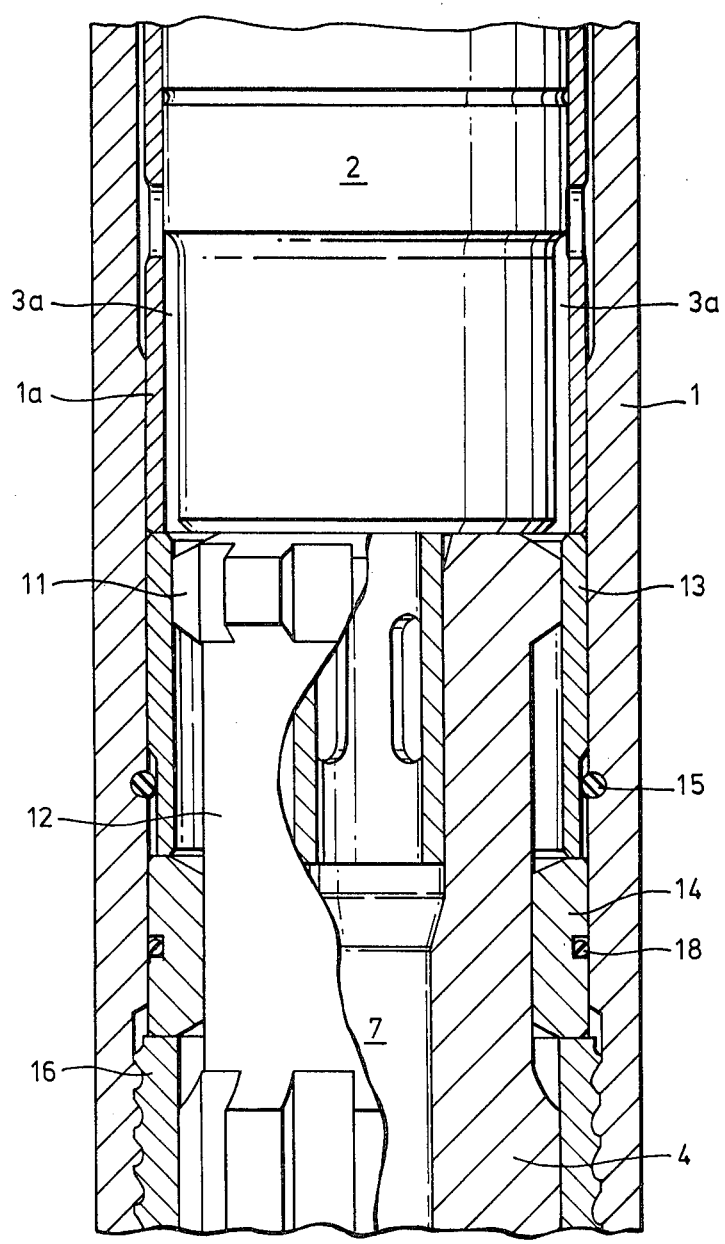
FIG. 4 is an enlargement, to the same scale as FIGS. 2 and 3, or part of FIG. 1B.

The bit-retaining and sealing ring 14 is illustrated in detail in FIGS. 2 and 3. This ring is formed of hardenable steel and in manufacture it is rough turned as a complete ring and then heat-treated. The ring is then diametrically divided, whereafter the mating faces of the two parts are ground and all rough edges are removed. The two parts are then held together and machined to the required finished dimensions.

In assembling the hammer unit, to fit a bit to the drill body, the retaining ring or chuck 16 is first passed into position over the bit shank. Thereafter the divided bit-retaining and sealing ring is assembled about the retaining and sealing portion 12 of the bit shank, an external groove 14a in the ring 14 being fitted with an O-ring or like elastomeric seal 18 that both serves to secure the parts of the ring 14 in position about the bit shank portion 12 and, in the assembled unit, to prevent air leakage between the ring 14 and the casing 1.

Thereafter the bit, fitted with the chuck 16 and ring 14, is introduced into the drill body, the chuck 16 being screwed home to trap the ring 14 in the position shown. During this assembly operation, the rotation of the chuck 16 is necessarily accompanied by rotation of the bit relatively to the casing 1 as a result of the interengagement of the splines on the bit with those in the chuck. However, this rotation of the bit is permitted by the freedom of the splined portion 11 thereof to rotate within the guide sleeve 13.

The arrangements for retaining, guiding and sealing the bit shank within the drill body as illustrated in the drawings may be applied with minimum modification to the retaining, guiding and sealing of the relatively telescoping portions of a shock-absorber unit for a hammer drill, whether such unit is integrated with the hammer unit or forms a detachable adjunct thereto. Indeed, in some constructions of hammer drill units incorporating the invention and having associated shock-absorber units, the parts of the shock-absorber unit corresponding with the bit shank and drill body have configurations matching those of the bit shank and drill body so as to enable common divided retaining and sealing rings 14 and chucks 16 to be used interchangeably for bit retention and sealing and in analogous functional relationships in a shock-absorber unit.

I claim:

1. Sealing means for telescopically related elements comprising an inner element and an outer element encircling at least part of said inner element, one said element having a cylindrical sealing surface in the region of said encirclement; a sealing ring diametrically divided into two semi-circular parts, said sealing ring being dimensioned to run sealingly and circumferentially uninterruptedly on said sealing surface; means for sealingly securing said sealing ring against axial movement on the other said element; and abutment means on said one element for engagement by said sealing ring to limit movement thereof on said sealing surface, thereby to limit relative motion of the elements.

2. Sealing means for telescopically related elements comprising an inner element and an outer element encircling at least part of said inner element, one said element having a cylindrical sealing surface in the region of said encirclement; a sealing ring diametrically divided into two semi-circular parts, said sealing ring being dimensioned to run sealingly and circumferentially uninterruptedly on said sealing surface; means for sealingly securing said sealing ring on the other said element; abutments on said one element for engagement by said sealing ring to limit movement thereof on said sealing surface; and means for fixing said sealing ring against axial movement with respect to the said other element, thereby to limit relative motion of the elements.

3. The sealing means of claim 2, said sealing ring being formed of hard wear-resistant material and being fitted with an undivided elastomeric sealing element to engage one of said elements.

4. The sealing means of claim 3, in which said sealing ring has an internal dimension corresponding to the base dimension of a groove providing said cylindrical sealing surface and disposed between axially spaced-apart abutments on the said inner element, and an external dimension exceeding the external dimension of at least one of said abutments, whereby said undivided elastomeric sealing element may be fitted to the external surface of the sealing ring, following assembly of the latter in said groove, by passing the sealing element over said one abutment.

5. The sealing means of claim 4, in which said sealing ring has an external groove to receive said elastomeric sealing element.

6. A fluid-powered free piston down-the-hole hammer drill comprising a drill body and a bit having a shank telescopically received in said drill body, one of said bit shank and said drill body having a cylindrical sealing surface; and a diametrically divided sealing ring dimensioned to run sealingly and circumferentially uninterruptedly on said cylindrical sealing surface and sealingly to engage the other of said shank and said drill body.

7. The hammer drill of claim 6, in which said sealing surface is on said bit shank and comprises the base of a groove disposed between abutments on said shank, and said sealing ring is axially fixed in said drill body.

8. The hammer drill of claim 7, in which said sealing ring is formed of hardened steel and has an external dimension exceeding that of said abutments, to be located axially in the drill body between a guide sleeve and a retaining ring therein.

9. The hammer drill of claim 8, in which said sealing ring has an external circumferential groove, an elastomeric sealing element for engaging the drill body between said guide sleeve and said retaining ring being positioned in said circumferential groove.

* * * * *